United States Patent Office 2,945,890
Patented July 19, 1960

2,945,890

PRODUCTION OF 2:4-DINITRORESORCINOL

William Gordon Allan, Ardrossan, Scotland, assignor to Imperial Chemical Industries Limited, a corporation of Great Britain No Drawing. Filed June 23, 1953, Ser. No. 363,695

Claims priority, application Great Britain Aug. 15, 1952

4 Claims. (Cl. 260—622)

The present invention relates to improvements in or relating to the production of 2:4 dinitroresorcinol.

The object of the present invention is to provide a method for producing 2:4 dinitroresorcinol economically and in a homogeneous physical form particularly suitable for use in explosives and gas producing compositions.

According to the present invention the method for the production of 2:4 dinitroresorcinol comprises effecting the sulphonation of resorcinol by heating it with sulphuric acid, cooling the solution of sulphonic acids so obtained, adding nitric acid in amount slightly in excess of 2:1 molecular ratio at a controlled temperature, adding water to form a solution except for some styphnic acid present, removing any undissolved matter, and refluxing the solution in the presence of sulphuric acid in an amount greater than 10 times the weight of resorcinol and in a concentration sufficient to form a solution having a boiling point between 130 and 135° C. and to maintain the resulting 2:4 dinitroresorcinol in solution.

Preferably an amount of sulphuric acid greater than 10 times the weight of resorcinol is present during the sulphonation stage and the total quantity of sulphuric acid used is 20 times the weight of resorcinol. Furthermore it is desirable that the concentration of sulphuric acid in the solution during hydrolysis should not be increased appreciably beyond that specified since this is liable to lead to a deterioration of the product due to charring.

In accordance with one embodiment of the process of the invention resorcinol is heated with 20 times its weight of 95% sulphuric acid so as to form a solution of resorcinol sulphonic acids in sulphuric acid. The mixture is then cooled to about 20° C. and a slight excess over 2 mols. of concentrated nitric acid (of approximately 95% concentration) per mol. of resorcinol originally present is added with stirring, the temperature being maintained between 20–25° C. during this addition. The liquid reaction mixture so obtained is then diluted with sufficient water to give a solution of boiling point 130–135° C. and any undissolved styphnic acid is removed by filtration. The filtrate is then refluxed at 130–135° C. to hydrolyse the 2:4 dinitroresorcinol-sulphonic acid to 2:4 dinitroresorcinol. When hydrolysis is completed the mixture is cooled, with or without the addition of water, causing the 2:4 dinitroresorcinol to be precipitated. The 2:4 dinitroresorcinol which is in the form of flakes is then filtered off, washed and dried.

The invention is illustrated by the following example in which all parts are by weight.

Example 1 part of resorcinol is added to 20 parts of 95% sulphuric acid and the mixture heated to 90° C. and maintained at that temperature for 30 minutes after which it is cooled to 20° C. 1.25 parts of 95% nitric acid are added slowly with stirring while the temperature is maintained at 20–25° C. and the mixture stirred for a further 15 minutes. 14.4 parts of water are then added to the mixture and any undissolved styphnic acid is removed by filtration. The filtrate is refluxed for 1¾ hours at 130–135° C. The mixture is diluted and cooled by adding it to 4.5 parts of cold water whereby the 2:4 dinitroresorcinol is precipitated. The flakes of 2:4 dinitroresorcinol so obtained are filtered off, washed with water and dried in air at 60° C. A yield of 1.25 parts of 2:4 dinitroresorcinol, i.e. 69% of theory, is obtained, the product having a melting point of 144°–145° C.

What we claim is:

1. A method for the production of 2:4 dinitroresorcinol which comprises effecting the sulphonation of resorcinol by heating it with 95% sulphuric acid, cooling the solution of sulphuric acid so obtained, adding 95% nitric acid in amount slightly in excess of a 2:1 molecular ratio, adding water, removing any undissolved matter, and refluxing the solution at a temperature between 130 and 135° C. in the presence of sulphuric acid in an amount between 10 and 20 times the weight of the resorcinol.

2. A process according to claim 1 wherein the nitric acid is added while maintaining the temperature at 20 to 25° C.

3. A method as claimed in claim 1 wherein the total quantity of sulphuric acid used is 20 times the weight of resorcinol.

4. A process of making 2,4-dinitroresorcinol comprising adding one part of resorcinol to 20 parts of 95% sulfuric acid, heating the mixture to 90° C., maintaining the temperature at 90° C. for 30 minutes, then cooling to 20° C., adding 1.25 parts of 95% nitric acid slowly with stirring while maintaining the temperature at 20 to 25° C., stirring the mixture for an additional 15 minutes, adding 14.4 parts of water, removing undissolved matter by filtration, refluxing the filtrate for 1¾ hours at 130 to 135° C., diluting the mixture with 4.5 parts of cold water and thereby precipitating the dinitroresorcinol, and recovering the dinitroresorcinol by filtration.

References Cited in the file of this patent

UNITED STATES PATENTS

| | | |
|---|---|---|
| 1,380,186 | Brewster | May 31, 1921 |
| 2,301,912 | Jones et al. | Nov. 10, 1942 |

FOREIGN PATENTS

| | | |
|---|---|---|
| 162,578 | Great Britain | May 5, 1921 |

OTHER REFERENCES

Beilstein's Handbuch der organischen Chemie, 4th ed., vol. 6, page 827 (1943). Published by Edwards Bros. Inc., Ann Arbor, Mich.

Weygand: Organic Preparations, Interscience Publishers, Inc., New York (1945), pages 291–2.